Sept. 13, 1949.  G. L. SCHUYLER  2,481,542
DISPLACEMENT LAUNCHER FOR PROJECTILES
Filed Aug. 13, 1946  2 Sheets-Sheet 2
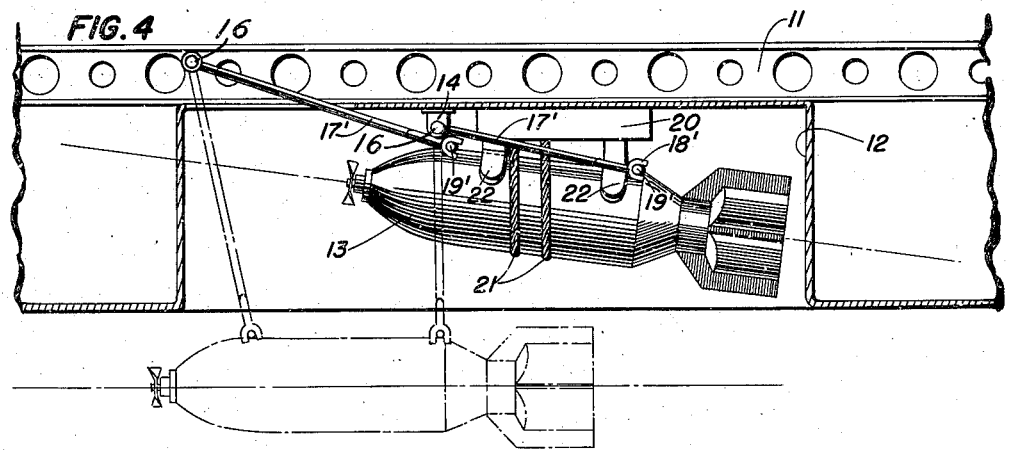
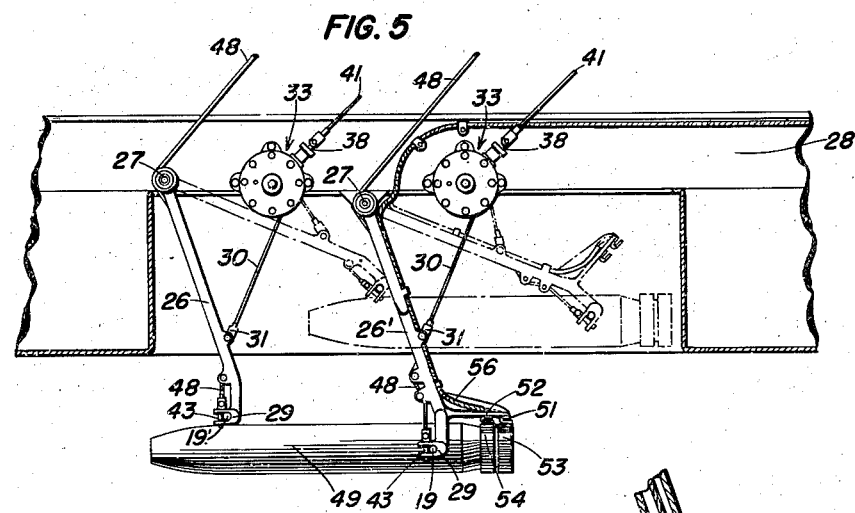
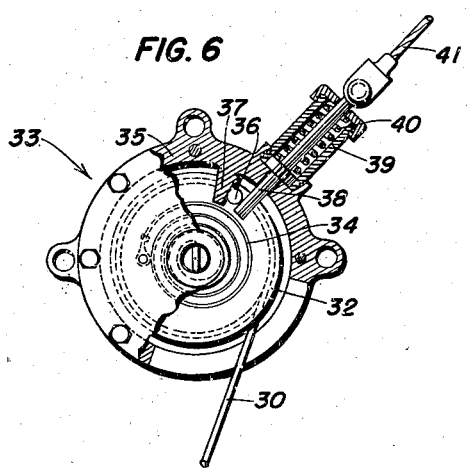
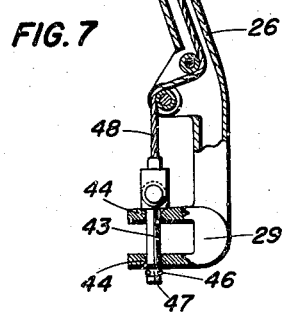
INVENTOR
GARRET L. SCHUYLER
BY
ATTORNEY Patented Sept. 13, 1949

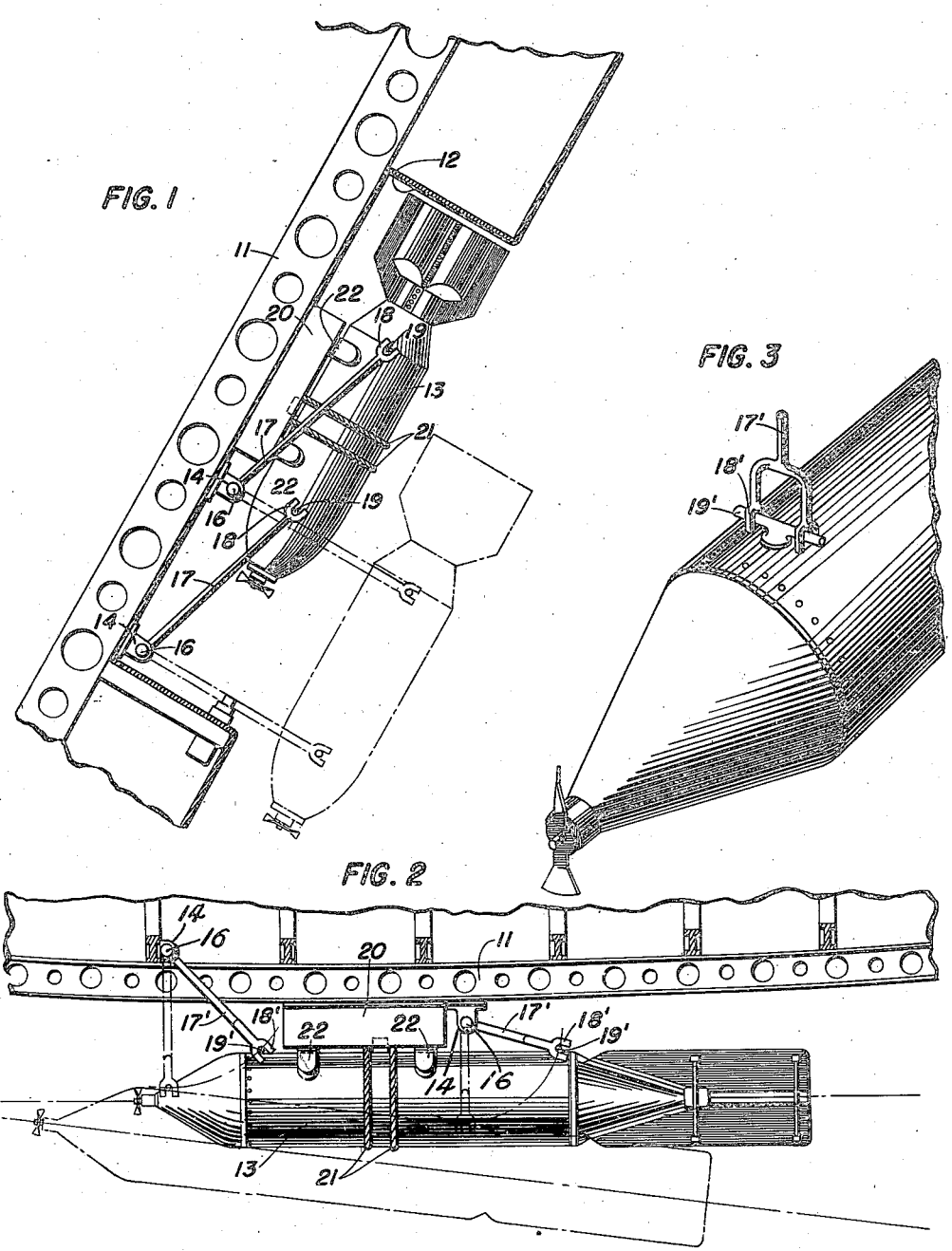

2,481,542

UNITED STATES PATENT OFFICE 2,481,542

DISPLACEMENT LAUNCHER FOR PROJECTILES

Garret L. Schuyler, United States Navy, Washington, D. C., assignor to the United States of America as represented by the Secretary of the Navy Application August 13, 1946, Serial No. 690,193

(3 Claims. (Cl. 89—1.7)

(Granted under the act of March 3, 1883, as amended April 30, 1928; 370 O. G. 757)

This invention relates to devices for controlling the first few feet of the flight path of a bomb or other projectile after it has been released from an aircraft; particularly, the invention relates to projectile displacing means adapted to assure that the bomb or projectile will follow a prescribed initial path in its fall until it has travelled a predetermined distance from the aircraft and that the projectile will be in a certain desired attitude with respect to the aircraft at that point so that its subsequent flight path, whether defined simply by free fall or auto propulsion, will carry it safely from the vicinity of the aircraft.

The need for bomb displacement gear was first recognized a number of years ago when dive-bombing tactics first came into prominence. It then became apparent that a bomb carried substantially along the center line of an aircraft could not be released when the aircraft was diving at a relatively large angle without the possibility of its fouling the under-carriage of the aircraft or falling through the arc described by the the propeller. One form of bomb displacing gear which overcame these difficulties incidental to bomb release from aircraft in a steep dive is that described in U. S. Patent No. 2,177,673 to Schuyler, Miles, and Chadwick, and this device has been used extensively and with satisfaction by both services. With the development of new and larger bombs, however, the single fork construction heretofore employed as the means for displacing the bomb from the aircraft was found inadequate to provide the necessary protection to the underside of the aircraft since these large bombs may rotate somewhat on their trunnions prior to falling away from the bomb displacement gear bringing either the tail assembly or the fuze of the bomb in contact with the plane's under-carriage. For example, even when bombs are dropped in level, horizontal flight there have been instances of aircurrents along the undersurfaces of the aircraft operating in such a way as to cause the tail to foul and to dig into the surface so that bomb fenders have been found desirable.

In the bomb displacing gear described in Patent No. 2,177,673 a single fork assembly is employed, the free ends of which are adapted to engage a pair of trunnions fixed to the bomb approximately at its center of gravity. Thus, when the bomb is released from the aircraft, whether in level flight or in a dive, the bomb is made to follow an arcuate path, the minimum radius of curvature of which is limited by the length of the fork arms. However, very large bombs and rocket projectiles recently added to the field of airborne ordnance cannot be handled by such displacing gear with complete safety, and it is to the development of a new and improved type of displacing gear capable of use with such projectiles, especially rockets, that the present invention is directed.

Therefore, an object of the invention is to provide a bomb displacing device capable of directing an airborne projectile a safe distance from the aircraft before it is allowed to fall freely.

Another object of the invention is to provide a device for displacing an airborne rocket projectile a safe distance from the carrying aircraft before the projectile is ignited.

An additional object of the invention is to provide a projectile displacing device for aircraft which may be used to suspend the rocket projectile from the aircraft and thus constitute a bomb rack, and which, moreover, will be capable of displacing the rocket projectile from the bomb bay into a certain predetermined attitude with respect to the aircraft at the moment of release.

Other and ancillary objects and advantages of the present invention will become apparent from the following specification and drawings in which:

Fig. 1 is a longitudinal sectional view of a portion of an aircraft in a diving attitude and illustrates, in elevational view, one form of the bomb displacing gear of the present invention;

Fig. 2 is a longitudinal sectional view of a part of an airplane structure and illustrates, in elevational view, another form of my bomb displacing gear in which the displacing forks are of different lengths and pivoted from points of unequal elevation in the airplane, causing the projectile to assume the dotted position immediately prior to release;

Fig. 3 depicts a portion of an aircraft projectile provided with a single forward trunnion, and illustrates in detail the manner in which a displacement fork engages the trunnion;

Fig. 4 is a longitudinal sectional view of an under-carriage portion of an aircraft and depicts in elevational view the manner in which my bomb displacing gear may be employed to position a bomb within an airplane in any of several desired angles of inclination to the deck of the aircraft;

Fig. 5 illustrates a preferred embodiment of the projectile displacing gear of my invention in which the device is employed also as the projectile suspension means, and may be used to maintain an aircraft rocket projectile in any one of several desired attitudes beneath the plane immediately prior to ignition of its propelling charge;

Fig. 6 is a cross-sectional view of the cable release mechanism employed in conjunction with the bomb displacing gear illustrated in Fig. 5;

Fig. 7 is a detailed cross-sectional view of the retaining hooks of the projectile displacing gear depicted in Fig. 5 and which are adapted for engagement with the projectile trunnions as shown.

Referring now specifically to Figs. 1, 2 and 4, there is illustrated a portion of an airplane fuselage 11 which may be provided with a recess or bomb bay 12 to receive a projectile 13. Mounted securely on a rigid portion of the fuselage are brackets 14 provided with pivots 16 for carrying displacing arms 17. The displacing arms are bifurcated at their free ends to form forks 18, the fingers of which are adapted to surround partially trunnions 19 which are secured to the exterior of the projectile. It will be noted that the opening of the forks 18 is disposed in the direction of the longitudinal axis of the displacing arms 17, thereby insuring an unimpeded separation of the projectile from the arms 17. Although the arms are shown straight, if convenience so dictates a curvature in the arms between the two bearing points may be adopted.

The displacing arms 17 are provided in pairs (Figs. 1 and 4) wherein they are conjointly or independently pivoted in brackets 14, or as in Fig. 2 they may comprise a single shaft as 17' and bifurcated at some point above the forks 18' to permit two-point contact between the displacing arm and the trunnions 19 or 19'.

Any conventional bomb rack 20 may be used in conjunction with the bomb displacing gear of the present invention; in the bomb rack depicted in Figs. 1, 2 and 4 cables 21 support the projectile while sway-braces 22 are used to prevent any transverse motion of the bomb with respect to the fuselage of the plane.

The brackets 14, of course, may be attached to the fuselage in almost any desired position, and it is evident that the wide choice of these positions coupled with the variations possible in length of the displacing arms will permit the projectile to be stowed in the aircraft at any reasonable angle to the longitudinal axis thereof, as shown in Fig. 4, or, alternatively, to permit the projectile to be stowed within the plane parallel to the longitudinal axis thereof, but upon release to position the projectile so that its longitudinal axis is not parallel with that of the aircraft, as shown in Fig. 2.

In addition to performing its primary function as a projectile displacing mechanism, it will be seen from Figs. 1, 2 and 4 that the displacing gear of the present invention also materially assists in supporting the projectile in its bomb bay or in an exterior position, and is particularly effective to restrain longitudinal motion of the projectile with respect to the bomb rack. Furthermore, it is possible so to adapt my bomb displacing gear that it may, itself, perform all of the functions of a bomb rack, obviating the necessity therefor, and it is intended to include such structure within the scope of the present invention. A typical construction of this character is illustrated in Fig. 5.

In that figure displacing arms 26 and 26' are pivotally attached in tandem by any convenient means as pivots 27 to a rigid portion of the aircraft fuselage 28. The pivot arms, as for example in the instance of the forward displacing arm 26 (Fig. 5), may comprise a single shaft terminating in a fork 29 for engaging a single trunnion as 19' (Fig. 3) on top of the projectile. Alternatively, the displacing arms may be provided with a bifurcation at their free ends wide enough to straddle the projectile to be carried, each finger of such bifurcation terminating in a fork 29 adapted for carrying engagement with trunnions 19 situated at the sides of the projectile. This is the construction of the displacing arm 26'. A cable 30 is attached to each of the displacing arms 26 and 26' by any convenient means, as by conventional cable connection 31, and is the means by which the displacing arms are maintained in a retracted position until projectile release is desired. The other ends of the cable 30 are fixed to drums 32 (Fig. 6) of reels 33, the drums being biased continuously in a winding direction by spiral springs 34.

As shown in detail in Fig. 6, the drum 32 carries a stop pin 36 which is normally biased against a projection 37 of the case 35 by the spring 34 when cable 30 is not loaded. In this position of pin 36 the displacing arms 26 and 26' are fully retracted within the bomb bay or against the under-carriage of the aircraft. To retain the displacing arms in this retracted position when the latter are loaded the reel assembly is provided with a detent pin 38 disposed within a cylinder 39 and biased by a spring 40 as shown to restrain stop pin 36 from movement in an unwinding direction against the action of spring 34. A control cable 41 secured to detent pin 38 by any convenient means (not designated) permits outward movement of detent pin 38 to release stop pin 36 for movement in an unwinding direction under the influence of a tensile force in cable 30.

Referring again to Fig. 5 which illustrates the invention claimed herein, and additionally to Fig. 7, it will be seen that enclosing means for the rocket trunnions consists of the forks 29 which are provided with a latching mechanism. That mechanism comprises a latching pin 43 which normally reposes in holes 44 in forks 29, a spring retaining ring 46 which engages a groove 47 to retain the latching pin in its locked position (as shown in Fig. 7), and a control cable 48 attached by any convenient means to the latching pin to permit withdrawal of the latter when the projectile 49 is to be fired. Displacing arm 26' carries a bracket 50 equipped with electrical contacts 51 and 52 for electrical firing of a projectile, which contacts are adapted to engage contact rings 53 and 54 of projectile 49 when the displacing arms are in the lowered position shown in Fig. 5. An electric cable 56 supplies electrical current from any convenient source (not shown) to contacts 51 and 52.

Referring particularly to Figs. 5, 6 and 7 for a description of the operation of my invention, the projectile is carried in a retracted position while the aircraft is en route to the target. In this position the projectile and displacing gear assume substantially the dotted position of Fig. 5. Upon reaching the target and arranging the aircraft in proper firing attitude, the pilot extracts pin 38 from within the case 35 of each reel 33, the reels being unwound by the action of gravity upon the projectile. The projectile then assumes the lowered position indicated in Fig. 5. When firing the projectile the pilot first removes latching pins 43 from the forks 29 and then electrically energizes contacts 51 and 52 which are in engagement with contact rings 53 and 54 of the projectile. The detent pins 38 and latching pins 43 are moved manually by pulling on the cables shown or by any other convenient means; also, energization of the contacts 51 and 52 may be timed so as to take place automatically only after a predetermined time has passed after latching pins 43 have been extracted from the forks 29.

The invention herein described may be manufactured and used by or for the Government of the United States of America for governmental purposes without the payment of any royalties thereon or therefor.

I claim:

1. In combination with an aircraft having a bomb bay, projectile displacing apparatus operable in said bomb bay for supporting and guiding a rocket which has igniter contact rings and a trunnion, said apparatus including an arm having a fork at its outer end to receive the trunnion and aid in the support of the rocket in the bomb bay, a pivot in the bomb bay for the inner end of the arm, on which pivot the arm is swingable between inner and outer limits of angular movement at which the rocket assumes recessed and exposed positions in reference to the bomb bay, and a contact bracket carrying the contacts of an electrical circuit, said bracket extending rigidly off from the arm and establishing wide separation of its contacts from the igniter contact rings at the inner limit of movement of the arm but making progressively closer approach to said rings and final engagement therewith as the rocket nears and reaches the outer limit of movement of the arm.

2. In combination with an aircraft fuselage having a bomb bay, a pair of arms pivoted in tandem in the bomb bay to swing in and out, enclosing means at the outer ends of the arms to be occupied by the fore and aft trunnions of a rocket, said rocket having igniter contact rings at its aft end, electrical conductors forming part of an electrical circuit, following the aft arm and terminating in contacts, a bracket rigid on the aft arm and supporting the contacts for engagement with the rings, the angular attitude of the arms in respect to the bomb bay separating the contacts from the rings and bringing them into engagement therewith respectively when the arms assume their limits of movement on swinging in and out, and means for opening the enclosing means to release the trunnions at the circuit closing position of the aft arm and its contacts.

3. In combination with an aircraft fuselage having a bomb bay, a pair of arms pivoted in tandem in the bomb bay to swing in and out, forks at the outer ends of the arms to receive the fore and aft trunnions of a rocket, which rocket has igniter contact rings at its aft end, latches operable across the forks to enclose the trunnions, said latches respectively bearing the major weight of the rocket and being relieved of said weight by the transfer thereof to the forks as the arms assume innermost and extended attitudes in respect to the bomb bay, actuating means for the latches, trained over the pivots thereby to avoid an unwanted pull thereon while the arms move to the extended attitude, and firing means on the aft arm then engaging the contact rings in readiness to fire the rocket after a releasing pull on the actuating means at will.

GARRET L. SCHUYLER.

REFERENCES CITED

The following references are of record in the file of this patent:

UNITED STATES PATENTS

| Number | Name | Date |
|---|---|---|
| 2,400,589 | McArthur | May 21, 1946 |
| 2,409,210 | Jolly | Oct. 15, 1946 |
| 2,412,460 | Lee | Dec. 10, 1946 |
| 2,414,579 | Anderson et al. | Jan. 21, 1947 |
| 2,426,221 | Karp et al. | Aug. 26, 1947 |

FOREIGN PATENTS

| Number | Country | Date |
|---|---|---|
| 46,131 | France | Dec. 23, 1935 |
| 287,207 | Germany | Sept. 15, 1915 |
| 419,563 | Great Britain | Nov. 14, 1934 |